United States Patent Office 3,525,718
Patented Aug. 25, 1970

3,525,718
PROCESS FOR THE PRODUCTION OF POLYAMIDE RESIN AND PRODUCT
Michael Edward Derieg, West Orange, N.J., and Porter Louis Pickard, Jr., Corpus Christi, Tex., assignors to Celanese Corporation, New York, N.Y., a corporation of Delaware
No Drawing. Filed Apr. 25, 1967, Ser. No. 633,388
Int. Cl. C08g 20/02
U.S. Cl. 260—78                     10 Claims

ABSTRACT OF THE DISCLOSURE

One to two moles of certain beta-lactones, such as beta-propiolactone, are reacted with each mole of certain primary or secondary diamines, such as hexamethylene diamine, and piperazine, to produce an amino acid addition product; and the resulting amino acid addition product is dehydrated to form a polyamide resin. The polyamide resin, which may be linear and/or crosslinked, may possess a melting point in excess of 300° C., and may be used to form fibers, films, etc.

BACKGROUND OF INVENTION

The invention relates to polyamide resins. More particularly, the invention concerns linear and/or crosslinked polyamide resins of the nylon type, and an efficient process for producing the same.

Since about 1948 the chemistry of various beta-lactones, and particularly beta-propiolactone has undergone extensive investigation. For instance, many materials are known to be coreactants with beta-lactones, including certain amines. U.S. Pat. No. 2,548,155 to Gresham et al. discloses the preparation of N-substituted hydracrylamides by the reaction in an aqueous solution of beta-propiolactone and a water-soluble primary or secondary saturated monoamine. The production of amino acids by the reaction of beta-propiolactone and a monoamine has also been disclosed by Gresham et al. in the Journal of the American Chemical Society, volume 73, page 3168 (1951).

It is an object of the present invention to provide an efficient process for the production of polyamide resins.

It is an object of the invention to provide a process for the production of a polyamide resin utilizing readily available raw materials, such as beta-propiolactone.

It is another object of the invention to provide a series of polyamide resins.

It is a further object of the present invention to provide a series of high melting polyamide resins which are useful in the production of fibers, films, molding, or castings.

These and other objects, as well as the scope, nature and utilization of the invention will be apparent from the following detailed description and appended claims.

SUMMARY OF INVENTION

It has now been discovered that a process for the efficient production of a polyamide resin comprises reacting under essentially anhydrous conditions approximately one to two moles of a beta-lactone containing about 3 to about 15 carbon atoms per molecule with each mole of primary or secondary diamine containing from about 2 to about 6 carbon atoms per molecule to form an amino acid addition product, and subjecting the amino acid addition product to polymerization conditions in which the amino acid addition product is substantially dehydrated to form a polyamide resin.

The polyamide resin may be a high melting solid and be used in applications where nylon and Dacron have heretofore been utilized.

DESCRIPTION OF THE PREFERRED EMBODIMENTS

As is known in the art, beta-lactones are inner or cyclic esters of beta-hydroxy carboxylic acids. U.S. Pat. No. 2,356,459 to Küng discloses that such compounds may be obtained in good yields by the reaction of a ketene with an aldehyde or ketone.

Beta-lactones which are utilized in the present invention are compounds of the following structure:

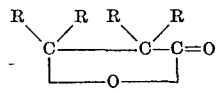

wherein each R is selected from the class consisting of hydrogen, lower alkyl groups and aryl groups so that the beta-lactone contains about 3 to about 15 carbon atoms per molecule. When a single aryl or phenyl group is present it may be substituted with one or more alkyl groups. Illustrative examples of suitable beta-lactones include: beta-propiolactone, beta-butyrolactone, beta-valerolactone, beta-isovalerolactone, alpha-methyl-beta-propiolactone, alpha-ethyl-beta-propiolactone, beta-isopropyl-beta-propiolactone, beta-methyl-beta-valerolactone and beta-phenyl-beta-propiolactone. Beta-propiolactone is the particularly preferred beta-lactone for use in the present invention primarily because of economic considerations and ready availability, and forms various mono- and di-beta-alanine derivatives of the diamines.

The diamines which are reacted with the beta-lactones in the initial step of the instant process contain from about 2 to about 6 carbon atoms per molecule and may be di-primary diamines, di-secondary diamines, or contain both a primary and a secondary amine group per molecule. Suitable aliphatic di-primary diamines possess the structure $H_2N(CH_2)_nNH_2$ where $n$ equals a whole number from about 2 to about 6. Illustrative examples of such aliphatic di-primary diamines include: 1,2-diaminoethane; 1,3-diaminopropane; 1,4-diaminobutane; 1,5-diaminopentane, and 1,6-diaminohexane (hexamethylene diamine). Suitable aromatic di-primary diamines include: 1,2-diaminobenzene; 1,3-diaminobenzene; and 1,4-diaminobenzene. Heterocyclic diamines containing a di-secodary diamine structure, such as piperazine and 2-methyl piperazine, may also be utilized. The particularly preferred diamines suitable for use in the present invention are hexamethylene diamine, and piperazine.

The initial step of the instant process in which an amino acid addition product is formed is conducted under essentially anhydrous conditions, and preferably in the absence of a catalyst. It is generally possible to form at will either mono- or di-amino acids depending upon the quantity of beta-lactone which is reacted with the primary or secondary diamine. It is also generally possible to produce mixtures of both mono- and di-amino acids. Therefore, about one to about two moles of the beta-lactone are caused to react with each mole of the primary or secondary diamine. It has been found, however, that there is a strong tendency for di-secondary diamines to form only mono-amino acid addition products, and accordingly the presence of a beta-lactone in excess of an equimolar quantity will not effectively enter into the reaction. For example, piperazine, when reacted with beta-propiolactone forms primarily 1-(2-carboxyethyl)piperazine to the substantial exclusion of N,N'-bis(2-carboxyethyl)piperazine. When essentially equimolar quantities of a di-primary diamine are caused to react with a beta-lactone according to the invention the resulting amino acid addition product generally contains one primary amine group, and one secondary amine group per molecule. When beta-propiolactone is reacted with an essentially equimolar quantity of 1,3-diaminopropane or hexamethylene diamine, primarily N-(2-carboxyethyl)trimethylenediamine and N-(2-carboxyethyl)hexamethylene diamine are formed respectively. When two moles of beta-propiolactone are reacted with each mole of 1,3-diaminopropane or hexamethylene diamine primarily N,N'-bis(2-carboxyethyl) trimethylene diamine and N,N'-bis(2-carboxyethyl)hexamethylene diamine are formed respectively.

The formation of the amino acid addition product is conducted with agitation in a non-aqueous medium which favors the production of the desired amino acid product to the substantial exclusion of other possible reaction products. For instance, when beta-propiolactone is selected as one of the reactants the formation of beta-propiolactone homopolymer and hydracrylamide derivatives are to be substantially avoided. Suitable reaction media in which the amino acid addition product may be formed include acetonitrile, ether, dioxane, and hydrocarbons such as benzene or toluene. Generally the reactants are largely soluble in the reaction medium selected. Acetonitrile is the preferred reaction medium used in the formation of amino acids. In a particularly preferred embodiment of the invention there is initially present in the reaction zone approximately 0.5 to 4.0 liters of acetonitrile per each mole of diamine coreactant, and the beta-lactone is added in increments with agitation. Since the reaction in which the amino acid addition product is formed is exothermic, the temperature of the reaction zone is adjusted so that a temperature of about 55° C. is not exceeded during the reaction. If higher temperatures are employed, the beta-lactone tends to homopolymerize. Preferred reaction temperatures range from about 0° C. to about 50° C. Particularly preferred reaction temperatures range from about 20° C. to about 50° C. Once the total quantity of beta-lactone reactant is added to the reaction zone, the mixture is suitably agitated by stirring for about ½ to about 4 hours so that the amino acid forming reaction may approach completion. Normally the presence of the precipitated addition product becomes visually apparent soon after the reactants are mixed in the reaction zone. Further precipitation of product may be accomplished by cooling the reaction mixture at the end of the reaction period to below room temperature, i.e., to between about 0° C. and about 20° C.

The amino acid addition product is recovered from the reaction mixture by any suitable means such as by filtration, centrifugation, or decantation. The product may be washed to remove unreacted beta-lactone and diamine. The product may also be further purified, if desired, by recrystallization from a suitable solvent.

During the final step of the instant process the amino acid addition product is subjected to polymerization conditions in which substantial dehydration occurs and a polyamide resin is formed. Dehydration is conducted thermally with or without the presence of a refluxing medium. If polymerization is conducted in the melt in the absence of a refluxing medium substantial crosslinking within the polymer is believed to occur. If the dehydration is conducted in the presence of a substantial quantity of a refluxing medium the polymer formed is believed to be largely linear in nature. The elevated temperature required to effectively dehydrate the amino acid addition product to form a polyamide resin varies with the particular addition product. Generally a dehydration temperature in the range from about 145° C. to about 275° C. may be utilized for a period of about ¼ hour to about 7 hours. When dehydration is conducted in the melt, such as by placement of the product on a heated stage, the amino acid addition product commonly melts and then subsequently solidifies to form a polyamide resin. In a particularly preferred embodiment the melt is heated under reduced pressure and in the presence of nitrogen or dried air. Suitable refluxing media in which the amino acid addition product may be dehydrated include methylformamide, dimethylsulfoxide, para-xylene, and toluene. The particularly preferred refluxing medium is para-xylene. When such media are utilized the addition product is covered by the same and reflux conditions are preferably maintained throughout the dehydration step of the process. As polymerization occurs, water is removed azeotropically with the refluxing medium. The water may be separated and the refluxing medium returned to the system. The amino acid and the polyamide resin formed may be either soluble or insoluble in the refluxing medium selected. The polyamide product may be readily separated therefrom by filtration, centrifugation, or any other suitable means, such as removing the medium by evaporation under reduced pressure. The following examples are given as specific illustrations of the invention. It should be understood, however, that the invention is not limited to the specific details set forth in the examples.

EXAMPLE I

A three-necked glass-lined reactor of about one liter capacity was fitted with a mechanical stirrer, dried thoroughly, and fitted with conventional drying tubes for protection from atmospheric moisture. 28.5 grams (0.25 mole) of hexamethylene diamine and 300 ml. of acetonitrile at 0° C. were added to the reactor. Stirring of the contents of the reactor was initiated, and 17.7 grams (0.25 mole) of beta-propiolactone were added dropwise at a rate of one milliliter per minute. The mixture was allowed to stand for two hours after the addition of the beta-propiolactone was complete during which time the temperature was allowed to rise to 25° C. During this period stirring was continued. Filtration and vacuum drying of the reaction mixture gave 43 grams of product, or a yield of 93 percent of largely N-(2-carboxyethyl) hexamethylene diamine. The product was a white solid melting at 115° C. to 120° C. The amino acid addition product was placed upon a Fisher-Johns stage and heated for approximately one hour. While maintained at a temperature of 200° C. to 250° C. the molten amino acid solidified indicating dehydration to a polyamide.

EXAMPLE II

A reactor was prepared as described in Example I so as to maintain essentially anhydrous reaction conditions. 20.0 grams (0.17 mole) of hexamethylene diamine and 350 ml. of acetonitrile at 0° C. were added to the reactor. Stirring of the contents of the reactor was initiated, and 24.5 grams (0.34 mole) of beta-propiolactone were added dropwise at a rate of one milliliter per minute. The mixture was allowed to stand for two hours after the addition of the beta-propiolactone was complete. During this period stirring was continued and the temperature was allowed to rise to 25° C. Filtration and vacuum drying of the reaction mixture gave 43 grams of a solid di-addition product or a yield of 97 percent of largely N,N'-bis(2-carboxyethyl) hexamethylene diamine. The product was again placed in the reactor, dissolved in about 400 ml. of dimethylformamide, and held at reflux temperature for four hours. Evaporation of the solvent yielded a grey solid polyamide having a primarily linear molecular structure which failed to totally liquify until heated to 145° C. The polyamide product was partially soluble in water and dimethylformamide, and was insoluble in acetone, ether, and benzene.

EXAMPLE III

A quantity of di-amino acid addition product as produced in Example II was maintained at a temperature between 150° C. and 175° C. under reduced pressure (5 mm. Hg) in a nitrogen atmosphere for 45 minutes. During this period dehydration was accomplished in the melt in the absence of a refluxing medium. The resulting polyamide possessed a largely crosslinked molecular structure which melted above 300° C. The polymer was a tough transparent plastic and was found to be insoluble in water, dimethylformamide, and acetone.

EXAMPLE IV

A reactor was prepared as described in Example I. 43.1 grams (0.5 mole) of piperazine and 400 ml. of acetonitrile at room temperature were added to the reactor. Stirring of the contents of the reactor was initiated, and 36.0 grams (0.5 mole) of beta-propiolactone were added incrementally within a period of 45 minutes. After 2 to 5 ml. of the beta-propiolactone had been added, a white precipitate formed. The temperature of the reaction mixture was allowed to reach, but not exceed 45° C. The reaction mixture was stirred for 2 hours following the total addition of the beta-propiolactone, and cooled to room temperature. Filtration and vacuum drying of the reaction mixture gave 75.0 grams of a fine white powder, or a yield of 95 percent of largely 1-(2-carboxyethyl) piperazine. The amino acid addition product had a melting point of 205–210° C. Dehydration of the amino acid product was accomplished in the melt under reduced pressure (5 mm. Hg) when the product was heated for one hour to a temperature of 275° C. where it solidified to an infusible transparent glass which was found to be insoluble in boiling water, hot acetone, and dimethylformamide. The polyamide product did not melt when heated to 300° C.

The polyamide resins produced by the present process are useful in a wide variety of applications. The product may possess a melting point in excess of 300° C. and be particularly suited for the production of high melting fibers which are insoluble in common solvents, or of engineering plastics which can be machined. Those polyamide products which are soluble in suitable solvents are particularly suited for the formation of films. Also, certain of the resins are useful for molding or casting.

Although the invention has been described with preferred embodiments, it is to be understood that variations and modifications may be resorted to as will be apparent to those skilled in the art. Such variations and modifications are to be considered within the purview and scope of the claims appended hereto:

1. A process for the production of a polyamide resin comprising reacting under essentially anhydrous conditions approximately one to two moles of a beta-lactone containing from about 3 to 15 carbon atoms per molecule with each mole of a primary or secondary diamine containing from about 2 to about 6 carbon atoms per molecule to form an amino acid addition product, and subjecting said amino acid addition product to polymerization conditions in which the amino acid addition product is substantially dehyrdated by heating to form a polyamide resin.

2. A process according to claim 1 wherein the beta-lactone is beta-propiolactone.

3. A process according to claim 1 wherein the primary or secondary diamine is selected from the group consisting of hexamethylene diamine, and piperazine.

4. A process according to claim 2 wherein the primary or secondary diamine is selected from the group consisting of hexamethylene diamine, and piperazine.

5. A process for the production of a polyamide resin comprising reacting under essentially anhydrous conditions approximately equimolar quantities of a beta-lactone of the structure:

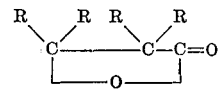

wherein R is selected from the group consisting of hydrogen, lower alkyl groups, and aryl groups so that the beta-lactone contains from 3 to 15 carbon atoms, and a di-primary aliphatic diamine of the structure $$H_2N(CH_2)_nNH_2$$

where $n$ equals 2 to 6 to form an amino acid addition product containing one primary amine group and one secondary amine group per molecule; and subjecting said amino acid addition product to polymerization conditions in which the amino acid addition product is substantially dehydrated by heating to form a polyamide resin.

6. A process according to claim 5 wherein the beta-lactone is beta-propiolactone, and the di-primary aliphatic diamine is hexamethylene diamine.

7. A process for the production of a polyamide resin comprising reacting at about 0° C. to about 50° C. for about ½ hour to about 4 hours in the presence of an acetonitrile reaction medium one to two moles of a beta-lactone containing from about 3 to about 15 carbon atoms per molecule with each mole of a primary or secondary diamine containing about 2 to about 6 carbon atoms per molecule to form an amino acid addition product; recovering said amino acid addition product; and heating said addition product at a temperature of about 145° C. to about 275° C. for about ¼ hour to about 7 hours to form a polyamide resin.

8. A process according to claim 7 wherein the beta-lactone is beta-propiolactone.

9. A process according to claim 7 wherein the primary or secondary diamine is selected from the group consisting of hexamethylene diamine, and piperazine.

10. A process according to claim 8 wherein the primary or secondary diamine is selected from the group consisting of hexamethylene diamine, and piperazine.

References Cited

UNITED STATES PATENTS

| | | | |
|---|---|---|---|
| 2,274,831 | 3/1942 | Hill | 260—78 |
| 2,691,643 | 10/1954 | Chirtel et al. | 260—78 |
| 2,968,629 | 1/1961 | Thompson | 252—389 |
| 2,786,045 | 3/1957 | Chirtel et al. | 260—78 |

WILLIAM H. SHORT, Primary Examiner

EARL A. NIELSEN, Assistant Examiner

U.S. Cl. X.R.

260—78.3, 534